United States Patent [19]

Bunge

[11] Patent Number: 4,571,132
[45] Date of Patent: Feb. 18, 1986

[54] COLLET ASSEMBLY
[76] Inventor: Lothar P. Bunge, 26648 Ryan, Warren, Mich. 48091
[21] Appl. No.: 389,205
[22] Filed: Jun. 17, 1982
[51] Int. Cl.[4] .......................... B23C 5/26; B23B 31/04
[52] U.S. Cl. ..................................... 409/234; 279/82; 408/239 R
[58] Field of Search ....................... 279/82, 81, 77, 78, 279/46 R, 52; 409/234; 51/237 CS, 217 R; 408/238, 239 R

[56] References Cited

U.S. PATENT DOCUMENTS

| | | | |
|---|---|---|---|
| 2,689,741 | 9/1954 | Emrick | 279/82 |
| 3,195,909 | 7/1965 | Winnen | 279/76 |
| 3,618,962 | 11/1971 | Cox | 279/82 |
| 3,672,692 | 6/1972 | Fauth | 279/82 |
| 3,811,694 | 5/1974 | Dahlman et al. | 279/87 X |
| 3,830,135 | 8/1974 | Sullivan | 279/76 X |
| 3,927,893 | 12/1975 | Dillon et al. | 279/82 X |
| 4,197,044 | 4/1980 | Cummings | 279/82 |
| 4,309,042 | 1/1982 | Fauth et al. | 279/82 X |
| 4,377,292 | 3/1983 | Staron | 279/82 X |

FOREIGN PATENT DOCUMENTS

| | | | |
|---|---|---|---|
| 658464 | 3/1938 | Fed. Rep. of Germany | 279/82 |
| 40306 | 3/1956 | Fed. Rep. of Germany | 279/82 |
| 1097157 | 7/1955 | France | 279/82 |

Primary Examiner—William R. Briggs
Attorney, Agent, or Firm—Cullen, Sloman, Cantor, Grauer, Scott & Rutherford

[57] ABSTRACT

A collet assembly for releasably holding a tool shaft of the type having an indexing depression in the surface thereof includes an elongate core having a bore in one end thereof for receiving the tool shaft. A retainer extending transversely through the core is shiftable into a locking position within the depression in order to prevent rotation of the shaft relative to the core. A tapered sleeve longitudinally slidable over the core engages and drives the retainer into the core. A collar threadably mounted on a core draws the sleeve in one longitudinal direction over the core in order to maintain the sleeve in a position locking the retainer in place.

29 Claims, 12 Drawing Figures

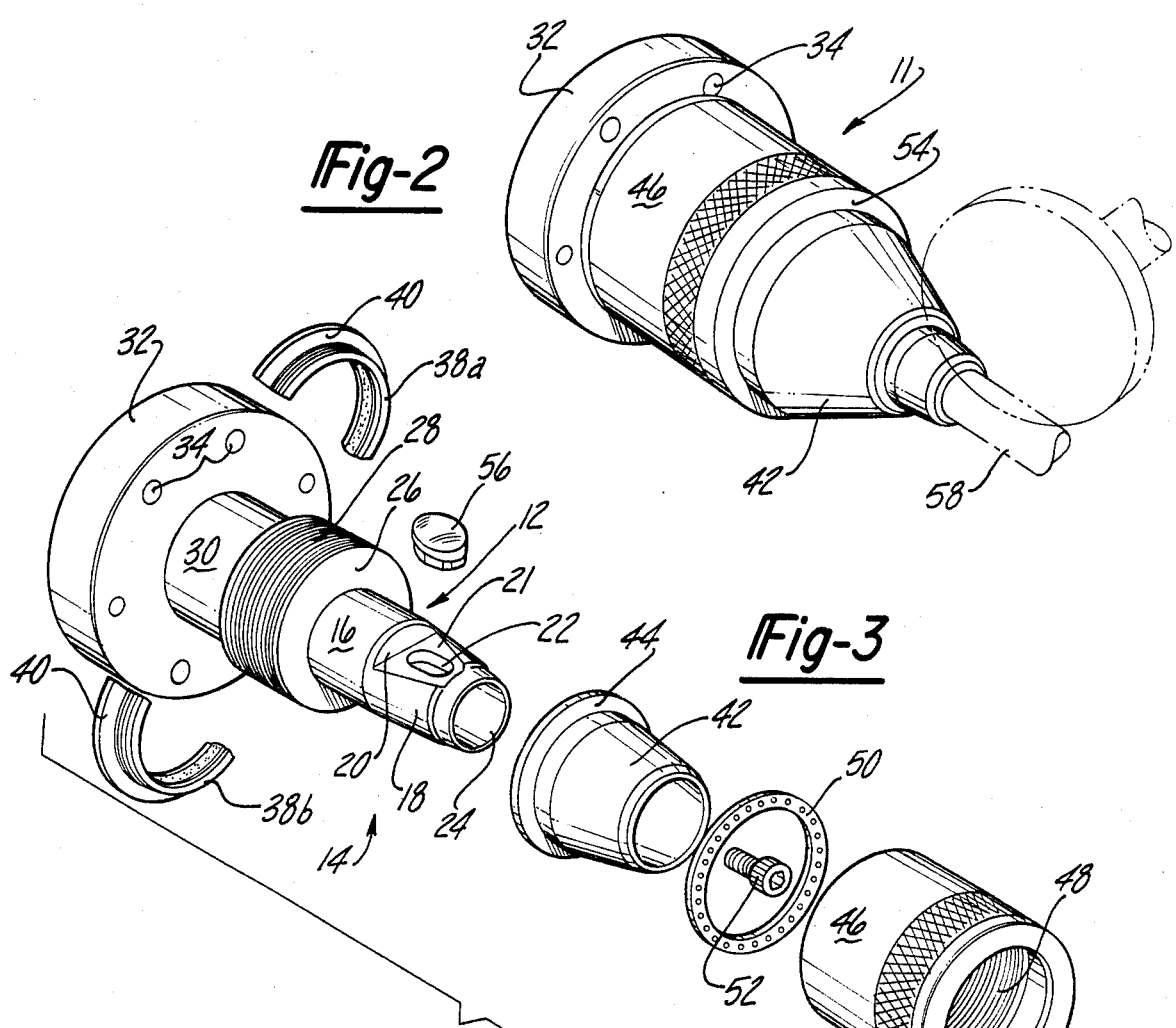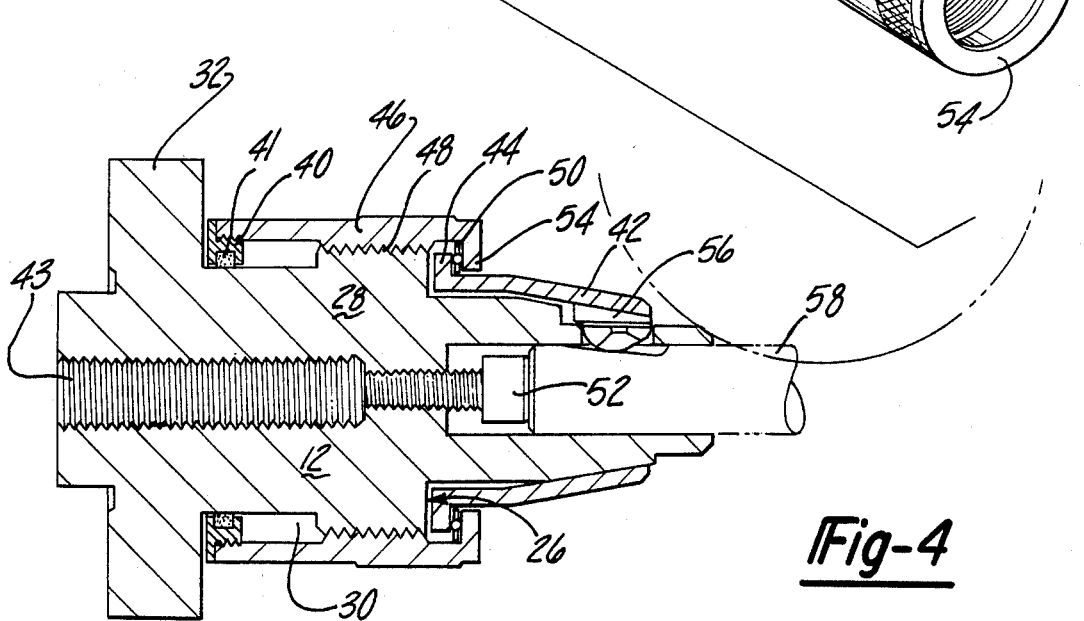

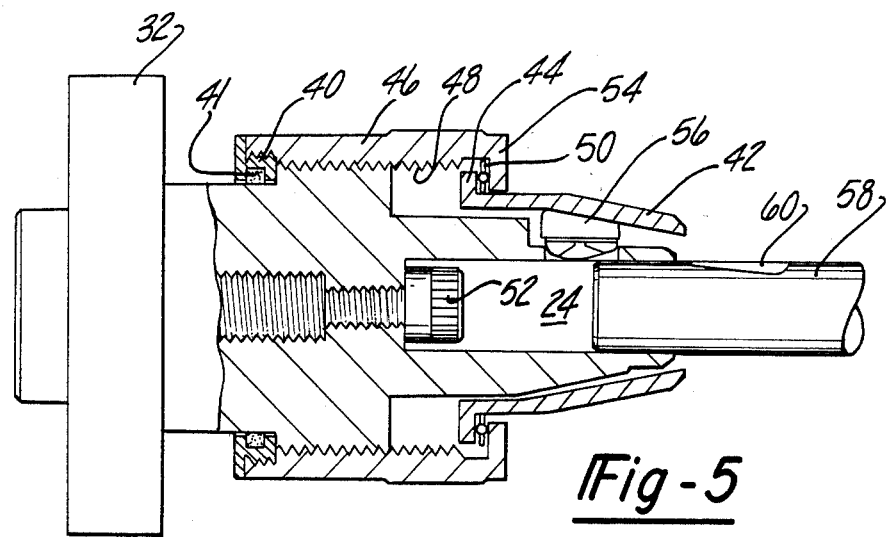
*Fig-5*
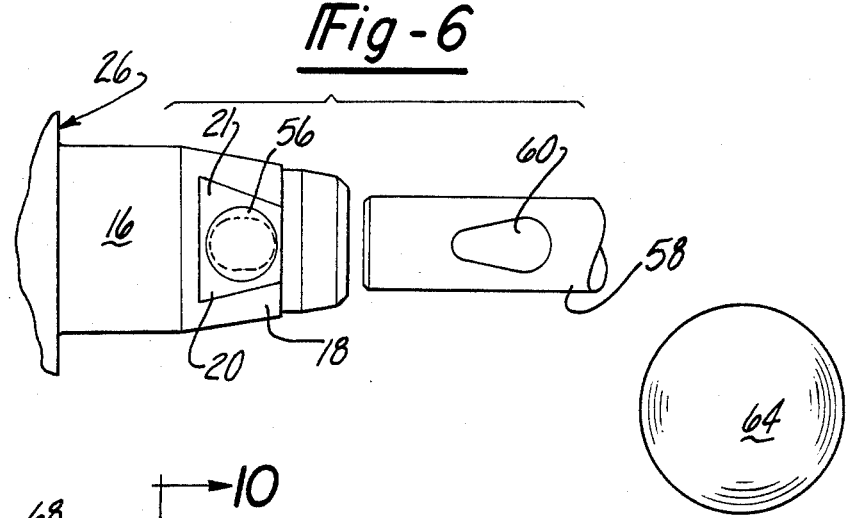
*Fig-6*
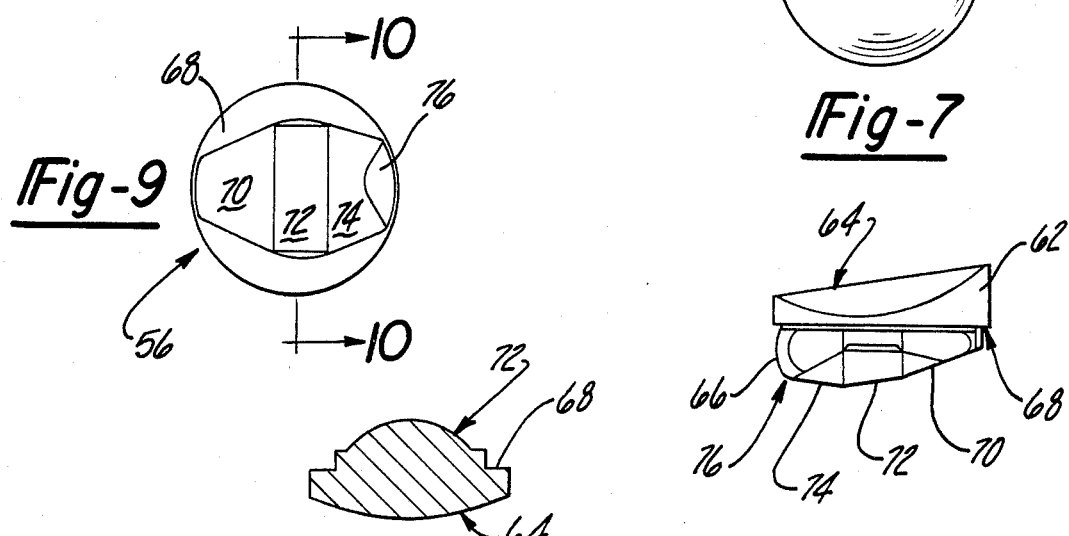
*Fig-7*
*Fig-9*
*Fig-8*
*Fig-10*

COLLET ASSEMBLY

DESCRIPTION

1. Technical Field

The present invention generally relates to collet assemblies, and deals more particularly with a collet construction for releasably holding rotatably indexable tool shafts of the type having an indexing depression therein.

2. Background Art

Various types of tools must be angularly indexed about an axis extending through the tool with great precision. For example, during the machining of a punching tool the shank of the punch must be rotated in indexed relationship to a grinding wheel on other machining device. These tools are provided with an elongate mounting shaft having an indexing depression (which is often teardrop shape) therein which registers with the holding element of a clamping block that holds the tool.

The prior art clamping block may be better appreciated by reference now to FIGS. 1a-1c of the drawings, which will be later described. As shown in FIG. 1a the prior art clamping block includes a rectangular metal body 1 having a bore in one face 2 thereof for receiving the shaft 3 of a tool to be machined, such as a punch. Shaft 3 is provided with a teardrop shaped depression 4 (FIG. 1b) in one side thereof which depression is arcuate in cross section. A second threaded bore in face 5 extends perpendicularly relative to shaft 3 and is provided with a set screw 6 which forces a circular holding ball 7 into the depression 4. The radius of the depression 4 varies from tool to tool, consequently, the radius of the ball 7 is selected so as to exceed that of the depression 4, thereby assuring that the ball will contact the depression 4 at two spaced apart points, as at 8a and 8b in FIG. 1b. Tightening of set screw 6 prevents rotation of the shaft 3 relative to body 1.

One problem associated with this prior art construction involves the fact that the body 1 of the clamping block was bulky and possessed a geometry which made it impossible to bring the tool shank into proximity with a machining tool, such as grinding wheel 8 (FIG. 1c), at the bottom 9 of the tool shank, adjacent face 2.

Another disadvantage of the prior art construction is the manner in which holding pressure was applied to the tool shaft. Because the radius of the holding ball 7 was slightly larger than the radius of the depression 4, permanent indentations were formed in the depression 4 at the contact points 8a and 8b when too much pressure was applied to the ball 7 by set screw 6. Contrarywise, less pressure would not hold the tool shaft 3 securely.

Off axis rotation of the shaft 3 also resulted from the fact that holding pressure was applied through the shaft (via the ball 7) only on one side of the shaft. This unidirectional application of pressure tended to produce a torque urging the shaft off the preestablished longitudinal axis of rotation.

Each of the deficiencies mentioned above are overcome by the collet assembly of the present invention, which has, as its primary object, the provision of an arrangement for holding the shaft which prevents rotation thereof while at the same time substantially eliminating off axis movement of the shaft.

Another object of the invention is to provide a collet assembly as described above with a quick release and locking feature that allows simple and rapid changing of tool shafts.

A still further object of the invention is to provide a collet assembly as described above which allows the bottom of the shaft being held to be brought into proximity to a machining tool.

These, and further objects of the invention will be made clear or will become apparent during the course of the following description of a preferred embodiment of the invention.

DISCLOSURE OF THE INVENTION

According to the present invention, a collet assembly for releasably holding a tool shaft of the type having an indexing depression in the surface thereof includes an elongate core having a bore in one end thereof for receiving the shaft. A novelty shaped retainer extending transversely through the core is shiftable into a locking position within the depression for preventing rotation or off axis movement of the shaft relative to the core. A sleeve longitudinally slidable over the core engages and holds the retainer in the locking position thereof. A collar threadably coupled with the core may be rotated to slide the sleeve into engagement with the retainer, thereby forcing the retainer into the indexing depression of the shaft. The outer end of the core and the locking sleeve are each tapered in geometry.

BRIEF DESCRIPTION OF THE DRAWINGS

In the drawings, which form an integral part of the specification and are to be read in conjunction therewith, and in which like reference numerals are employed to designate identical parts in the various views:

FIG. 2 is a perspective view of the collet assembly of the present invention, having a tool shaft locked in position therewithin, a grinding wheel being indicated in the phantom;

FIG. 3 is an exploded, perspective view of the collet assembly shown in FIG. 2;

FIG. 4 is a longitudinal, cross-sectional view of the collet assembly shown in FIG. 2;

FIG. 5 is a longitudinal view similar to FIG. 4, portions being broken away in section and depicting the assembly in a released position;

FIG. 6 is a plan view of the outer end of the collet core with a tool shaft aligned to be received within the bore;

FIG. 7 is a top plan view of the retainer;

FIG. 8 is a side view of the retainer shown in FIG. 7;

FIG. 9 is a bottom plan view of the retainer shown in FIGS. 7 and 8; and,

FIG. 10 is a cross-sectional view taken along the line 10—10 in FIG. 9.

BEST MODE FOR CARRYING OUT THE INVENTION

Figure 1A:
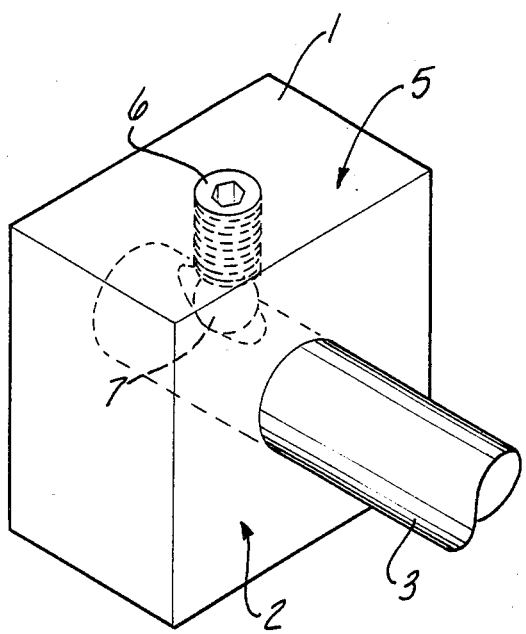
FIG. 1a is a perspective view of the prior art holding clamp.

Referring to the drawings, the present invention is broadly concerned with a collet assembly, generally indicated by the numeral 11, which is adapted to releasably hold a shaft 58 of a tool. Shaft 58 is provided with a teardrop shaped indexing depression 60 therein which is substantially arcuate in cross-section and slopes upwardly toward the free outer end of shaft 58. Indexing depression 60 is of conventional configuration and is intended to permit precise, indexable rotation about the longitudinal axis of the shaft.

The collet assembly 11 broadly includes a core 12, a retainer 56 extending into an oval throughhole 22 in the core 12, a locking sleeve 42 and an outer collar 46. The core 12 is provided with an annular mounting flange 32 having circumferentially spaced, longitudinally extending holes 34 for adapting the collet assembly to be mounted on a fixture or other rotatable tool. A threaded aperture 43 extends longitudinally into the rear of the core 12 and along the latters longitudinal axis for facilitating mounting of the collet assembly 11 on the fixture or tool.

The core 12 includes a threaded intermediate section 28 of increased diameter which threadably engages female threads 48 on collar 46. Female threads 48 are defined between the opposite extremities of the cylindrically shaped collar 46, there being provided a split ring retainer 40 threadably mounted on one end of collar 46, adjacent mounting flange 32. The split ring retainer 40 is defined by first and second halves 38a and 38b which extend radially inwardly from the interior surface of the collar 46, and are provided with an annular seal 41 comprising felt or the like which slidably engages a smooth section 30 of core 12. Retainer 40 normally prevents the collar 46 from being removed from the core 12 when the collar is unscrewed from engagement with the intermediate section 28 of core 12.

Core 12 includes a cylindrically shaped portion 16 having a diameter slightly less than that of section 30. The outer end of the core 12 includes a tapered portion 18 in the shape of a truncated cone. A triangularly shaped cut-out 20 in the tapered portion 18 defines a substantially flat surface 21 within which an oval throughhole 22 is provided.

The outer end of the core 12 is provided with a bore 24 which is aligned with the longitudinal axis of the core 12, and is substantially co-extensive with sections 16 and 18 of core 12. Bore 24 possesses a diameter marginally greater than that of shaft 58 so as to closely receive shaft 58 therein. A capped nut 52 is threadably received in the core 12 at one end of the bore 24 in order to define an adjustable stop which controls the penetration depth of the shaft 58 into bore 24.

Sleeve 42 possesses tapered interior sidewalls which are inclined at an angle substantially identical to the surface defining the taper portion 18 of core 12. An annularly extending base 44 on the large diameter end of sleeve 42 is trapped between a rim 54 of collar 46 and an annular shoulder 26 of the core 12. A bearing ring 50 between base 44 and rim 54 allows frictionless pressure to be applied to sleeve 42 as collar 46 is rotated (tightened) on threads 48.

A locking retainer 56 is disposed in the through hole 22 and is captured between the cutout 20 and sleeve 42. Retainer 56 includes a head 62 disposed above surface 21 and a foot 66 which extends downwardly into through hole 22 and into the indexing depression 60. Head 62 is defined by an upper surface 64 possessing a curvature and longitudinal inclination substantially identical to that of the inner surface of sleeve 42. In other words, surface 64 is arcuate in cross-section and is inclined relative to the longitudinal axis of the core 12 at an angle substantially identical to that of the sleeve 42.

The bottom of foot 66 which engages indexing depression 60 is defined by longitudinally successive surface sections 70-76. Surface section 72 possesses a curvature corresponding to that of indexing depression 60 and extends longitudinally a substantial length of the retainer 56. Depression 60 has the configuration of a portion of a cylinder depressed into shaft 58 at an angle; the radius of such cylinder is slightly smaller than the radius of surface 72 thus causing surface section 72 to bear on a substantial length of the edges of depression 60 thereby locking shaft 58 securely against rotation. The bearing surface between the foot 66 and the depression 60 comprises the entire length of surface section 72. Surface sections 70 and 74 are sloped upwardly from surface section 72 to initially slidably engage the bottom of depression 60 and then clear the shaft 58 when the latter is in a locked position.

Figure 1B:
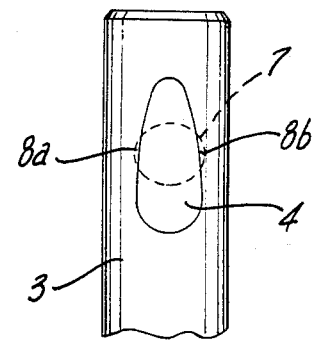
FIG. 1b is a fragmentary, sectional view of the holding clamp shown in FIG. 1a showing the contact between the holding ball and the sides of the depression.
Figure 1C:
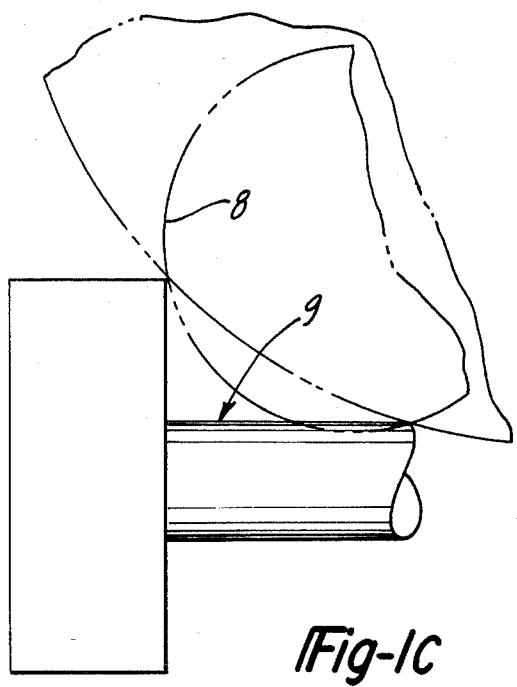
FIG. 1c is a side elevational view of the holding clamp shown in FIG. 1, a grinding wheel being indicated in the phantom.

In use, the collet assembly 10 is prepared for receiving the tool shaft 58 by unscrewing the collar 46 relative to the threaded portion 28 of core 12. Unscrewing of collar 46 releases sleeve 42 for outward sliding movement relative to the tapered portion 18 of core 12, as shown in FIG. 4. As the tapered interior surfaces of sleeve 42 are displaced away from the taper portion 18 of core 12, clearance is created between sleeve 42 and core 12, thus permitting outward radial displacement of the locking retainer 56. At this point, the tool shaft 58 may be inserted into the bore 24 of core 12 with the indexing depression 60 aligned in registration with the locking retainer 56. As retainer 56 enters depression 60 surfaces 72 and depression 60 are mated as previously described. In order to lock the retainer 56 in its locking position within depression 60, collar 46 is tightened (rotated clockwise as viewed in FIG. 1). Tightening of collar 46 draws sleeve 42 longitudinally toward the annular shoulder 26; this sliding movement of sleeve 42 causes the inner surface of the latter to slidably engage the upper surface 64 of the retainer 56, thus imposing a radially inwardly directed force on retainer 56. The pressure exerted by the sleeve on retainer 56 forces the latter downwardly into sliding engagement with the indexing depression 60. At the same time, however, the sleeve 42 applies pressure to the tapered portion 18 of core 12 at a position diametrically opposite that of retainer 56 so as to apply equal pressure through tapered portion 18 to the shaft 58. Bearing 50 allows sleeve 42 to float free of any radial pressure inadvertently created at mating surfaces 44 and 54. By this feature of the invention, equal pressure is radially applied to all sides of the shaft 58, thus maintaining shaft 58 on axis.

It may be appreciated from FIG. 2 that the tapered configuration of the collet assembly 11 allows the bottom of the shaft 58 to be brought into close proximity to a machine tool, such as grinding wheel 8.

In order to release the tool shaft 58, collar 46 is released by counterclockwise rotation (as viewed in FIG. 1), thereby creating clearance between rim 54 and shoulder 26, which allows longitudinal sliding of sleeve 42. Sliding movement of sleeve 42 releases locking element 56 so as to allow the latter to shift radially outward upon removal of shaft 58.

In view of the foregoing, it is apparent that the collet assembly described above not only provides for the reliable accomplishment of the objects of the invention, but does so in a particularly effective and reliable manner. It is recognized, of course, that those skilled in the art may make various modifications or additions to the preferred embodiment choosen to illustrate the inven-

I claim:

1. A collet for releasably holding a tool shaft of the type having an indexing depression in the surface thereof, comprising:
an elongate core having a bore in one end thereof for receiving said tool shaft therein and including a tapered outer surface adjacent said one end;
a retainer extending transversely through said core and shiftable into a locking position within said depression for preventing rotation of said shaft relative to said core;
a sleeve longitudinally slidable over said core and engageable with said retainer for holding said retainer in said locking position thereof, said sleeve including a tapered inner surface complementally engageable with said outer surface of said core;
means for selectively preventing longitudinal sliding movement of said sleeve whereby to maintain said sleeve in a selected longitudinal position thereof holding said retainer in said locking position thereof; and,
means mounting one end of said sleeve for free floating radial movement relative to said core.

2. A collet for releasably holding a tool shaft of the type having an indexing depression in the surface thereof to allow precise rotational indexing of said tool shaft, comprising:
a core having a cylindrical opening for receiving said tool shaft therein and a tapered outer surface, said tapered outer surface having an aperture therein extending radially therethrough and into said cylindrical opening;
a retainer extending through said aperture and radially shiftable into a locking position within said indexing depression to prevent rotation of said tool shaft relative to said core, said retainer including surface portions extending radially outwardly beyond said core;
a sleeve sleeved over said core and including a tapered inner surface, said tapered inner surface of said sleeve including first and second diametrically opposite sections, said first section of said tapered inner surface being engaged by said surface portions of said retainer, said second section of said tapered inner surface engaging said core;
means for producing a radially inwardly directed force on said retainer and said core substantially only through said first and second sections of said tapered inner surface of said sleeve, said force producing means including a collar connected and engageable with said sleeve; and,
means between said collar and said sleeve for reducing friction between said sleeve and said collar, whereby said sleeve may be freely transversely displaced when said tool shaft is inserted into said cylindrical opening and said retainer shifts radially outward to radially displace said sleeve.

3. The collet of claim 1, wherein said retainer includes an arcuate lower surface contacting opposite sides of said depression, said lower surface having a length sufficient such that the contact between said lower surface and said opposite sides extends along a substantial length of said depression.

4. The collet of claim 1, wherein said core includes a threaded section adjacent said tapered outer surface, and
said means for preventing longitudinal movement of said sleeve includes a collar around said core and engageable with said sleeve upon shifting thereof in one longitudinal direction, said preventing means including thread means conjugally engageable with said threaded section for locking said collar in one longitudinal position thereof.

5. The collet of claim 4, wherein said sleeve and said collar include mutually engageable annular shoulders for transmitting force from said collar to said sleeve, said mounting means including a bearing member disposed between said annular shoulders.

6. The collet of claim 1, including means for preventing rotation of said retainer within said core.

7. The collet of claim 1, wherein said tapered outer surface of said core and said tapered inner surface of said sleeve are each essentially conical in shape.

8. The collet of claim 4, including means coupled with said collar for limiting the longitudinal movement of said collar when said thread means is disengaged from said threaded section.

9. The collet of claim 1, wherein:
said core includes a cutout section in said tapered outer surface thereof,
said cutout section including an aperture therein extending transversely through said tapered outer surface into said bore,
said retainer being received within said aperture,
said retainer head being substantially wholly disposed within said cutout section when said retainer is in said locking position thereof.

10. A collet assembly for releasably holding a tool shaft of the type having an elongate indexing depression in the surface thereof, said depression extending longitudinally on said shaft and having a generally arcuate cross section, comprising:
a core provided with a longitudinal opening in one end thereof for receiving said tool shaft therein and having a generally circular cross section, said core having a reduced diameter portion adjacent said one end thereof and including a passageway in said reduced diameter portion extending transversely between the exterior of said core and said longitudinal opening;
holding means in said passageway and shiftable into said depression of said tool shaft for holding said tool shaft against rotation relative to said core;
locking means mounted for longitudinal movement over said core for shifting said holding means into said depression and including a surface slidably engageable with a portion of said holding means, said surface being inclined relative to the longitudinal axis of said core, said locking means being longitudinally shiftable between a released position in which said holding means is in clearing relationship to said depression and a locking position in which said holding means is shifted into a holding position within said depression;
means for selectively securing said locking means in said locking position thereof; and,
means for mounting at least a portion of said locking means for free floating radial movement relative to said core.

11. The collet assembly of claim 10, wherein said locking means includes a generally conically shaped sleeve surrounding said reduced diameter portion, said surface being defined on the interior of said sleeve, and said holding means includes a retainer having a head extending essentially parallel to said surface and a foot having a longitudinally extending arcuate surface engagable with the surface of said tool shaft defining opposite sides of said depression.

12. The collet assembly of claim 11, wherein said core includes a cut out section in the surface of said reduced diameter portion thereof and said head of said retainer is substantially wholly disposed within said cut out when said locking means is in said locking position thereof.

13. The collet assembly of claim 10, wherein:
said locking means includes a sleeve surrounding said reduced diameter portion of said core, and
said securing means includes a collar and means releasably connecting said collar and said sleeve, said securing means further including conjugally engagable threads defined on said core and said collar.

14. The collet assembly of claim 13, wherein:
said core includes a first radially extending, annular shoulder between said reduced diameter portion and said threads, and
said sleeve includes a radially extending rim bearing against said first shoulder when said locking means is in said locking position thereof.

15. The collet assembly of claim 13, wherein said securing means includes means for limiting the longitudinal movement of said collar in one direction corresponding to the released position of said locking means.

16. The collet assembly of claim 15, wherein:
said core further includes another reduced diameter portion adjacent said threads and a second annular shoulder defined between said another reduced diameter portion and said second annular shoulder, and
said limiting means includes a ring on said collar engagable with said second annular shoulder.

17. The collet assembly of claim 16, wherein said ring includes threads conjugally receivable by the threads on said collar, said ring further including first and second, discrete separable sections.

18. The collet assembly of claim 15, including a radially extending flange secured to the other end of said core.

19. The collet assembly of claim 14, wherein said mounting means includes a roller bearing disposed between said annular shoulder and said rim.

20. The collet of claim 2, wherein the longitudinal axis of said sleeve is substantially parallel to but axially offset from the longitudinally axis of said tool shaft.

21. The collet of claim 2 said tapered inner surface of said tapered outer surface of said core are each substantially continuous and rigid.

22. A collet for releasably holding a tool shaft of the type having an indexing depression in the surface thereof to allow precise rotational indexing of said tool shaft, comprising:
a core including first means on one end thereof for receiving said tool shaft therein;
second means extending generally transverse to said tool shaft through said core and shiftable into a locking position within said depression for preventing rotation of said shaft relative to said core;
a sleeve longitudinally slidable over said core and engaging said second means and said core for transmitting radially inwardly directed force on said second means and said core; and
third means for applying a radially inwardly directed force to said second means and said core through said sleeve to retain said second means in said locking position thereof and prevent off axis deflection of said tool shaft, said radially directed force being applied at diametrically opposite points about the longitudinal axis of said tool shaft, said third means including means for mounting said sleeve for radial and longitudinal movement on said core and tapered, mutually engaging surfaces respectively on the outer surface of said core and the inner surface of said sleeve.

23. The collet of claim 22, wherein said third means includes means for selectively changing the magnitude of force applied by said third means to said second means and said core.

24. The collet of claim 22, wherein said sleeve includes a circumferentially continuous, rigid sidewall.

25. A collet for releasably holding a tool shaft of the type having an indexing depression in the surface thereof to allow precise rotational indexing of said tool shaft, comprising;
a core having an elongate cavity for receiving said tool shaft therein and an aperture transversely into said cavity;
a sleeve over said core and engagable with said retainer means for engaging and shifting said retaining means into said locking position thereof, said sleeve being displaceable from a released position allowing removal of said tool shaft from said core and a holding position holding said retainer means in said locking position thereof, said sleeve being longitudinally and radially shiftable upon displacement thereof from said released position to said holding position; and,
means for mounting at least portions of said sleeve for free floating radial movement relative to said core during displacement of said sleeve from said released position to said holding position.

26. The collet of claim 25, including a collar over said sleeve for applying a displacement force to said sleeve, said sleeve being radially shiftable within said collar when said sleeve is in said released position thereof.

27. The collet of claim 26, wherein said mounting means includes bearing means between and engaging said sleeve and said collar for allowing substantially free radial sliding movement between said sleeve and said collar.

28. The collet of claim 27 wherein said core and said sleeve include overlapping, tapered surface areas respectively engaging each other.

29. The collet of claim 22, wherein said third means includes a collar engaging said sleeve and a pair of conjugally mating threads respectively on said collar and said core, said sleeve being longitudinally displaceable on said core between a tool shaft release position and a tool shaft locking position upon rotation of said collar relative to said core.

* * * * *